(12) United States Patent
Kets

(10) Patent No.: US 10,619,510 B2
(45) Date of Patent: Apr. 14, 2020

(54) DEVICE FOR CONTROLLING ANGULAR POSITION OF TURBINE BLADES OF A PROPELLER DEVICE

(71) Applicants: Yury Vorzobov, Quiryat Arba (IL); Josef Kets, Quiryat Arba (IL)

(72) Inventor: Josef Kets, Quiryat Arba (IL)

(73) Assignee: Emery Ungar, Spring Valley, NY (US)

( * ) Notice: Subject to any disclaimer, the term of this patent is extended or adjusted under 35 U.S.C. 154(b) by 1019 days.

(21) Appl. No.: 14/895,217

(22) PCT Filed: Dec. 10, 2013

(86) PCT No.: PCT/IL2013/051017
§ 371 (c)(1),
(2) Date: Apr. 17, 2016

(87) PCT Pub. No.: WO2014/195931
PCT Pub. Date: Dec. 11, 2014

(65) Prior Publication Data
US 2016/0169031 A1 Jun. 16, 2016

Related U.S. Application Data

(60) Provisional application No. 61/831,183, filed on Jun. 5, 2013.

(51) Int. Cl.
*F01D 17/18* (2006.01)
*F03D 7/02* (2006.01)
(Continued)

(52) U.S. Cl.
CPC ............ *F01D 17/18* (2013.01); *B64C 11/346* (2013.01); *F03D 7/0224* (2013.01); *F03D 7/041* (2013.01);
(Continued)

(58) Field of Classification Search
CPC ........ F01D 17/18; F03D 7/024; F03D 7/0224; F03D 7/041
See application file for complete search history.

(56) References Cited

U.S. PATENT DOCUMENTS 1,425,922 A 8/1922 Wesnigk
2,113,478 A * 4/1938 Gobereau ............. B64C 11/346
416/37

(Continued)

FOREIGN PATENT DOCUMENTS

FR 791525 12/1935
GB 337324 10/1930

*Primary Examiner* — Kenneth J Hansen
*Assistant Examiner* — Aye S Htay
(74) *Attorney, Agent, or Firm* — Emerson, Thomson & Bennett, LLC; Roger D. Emerson; Peter R. Detorre

(57) ABSTRACT

A device for automatic control of an angular position of turbine blades of a propeller device, in which the turbine blades are rotatable about a rotational axis and are pivotally displaceable about their respective pivot axes. The device includes a set of control blades kinematically connected with the turbine blades, said control blades are pivotally displaceable about respective pivot axes once the propeller device is exposed to a flow of fluid. The device further includes a transmission unit configured for transmitting pivotal displacement of the control blades to the turbine blades such that the turbine blades could be pivoted by the control blades. Pivoting of the turbine blades takes place simultaneously with the pivoting of the control blades. The angular disposition of the turbine blades is automatically set and remains invariant irrespective of direction of the flow of fluid.

16 Claims, 14 Drawing Sheets

(51) Int. Cl.
  *F03D 7/04*  (2006.01)
  *B64C 11/34*  (2006.01)
(52) U.S. Cl.
  CPC ......... *F05B 2260/79* (2013.01); *Y02E 10/723* (2013.01)

(56) References Cited

U.S. PATENT DOCUMENTS

| | | | |
|---|---|---|---|
| 2,152,419 A | | 3/1939 | Platt |
| 2,326,308 A | * | 8/1943 | Reissner ................. B64C 11/34 416/37 |
| 2,352,186 A | | 6/1944 | Corrigan |
| 2,358,967 A | * | 9/1944 | Everts ..................... B64C 11/34 416/37 |
| 2,382,072 A | | 8/1945 | Lea |
| 2,503,822 A | * | 4/1950 | Howes .................... F04D 27/00 416/162 |
| 2,514,459 A | * | 7/1950 | Stalker .................... B64C 27/54 416/112 |
| 2,577,065 A | | 12/1951 | Zimmerman |
| 3,245,475 A | | 4/1966 | Cooper |
| 4,578,019 A | | 3/1986 | Safarik |
| 4,692,093 A | | 9/1987 | Safarik |
| 6,441,507 B1 | * | 8/2002 | Deering ................ F03D 7/0208 290/44 |
| 2018/0017041 A1 | * | 1/2018 | Damgaard .............. F03D 80/70 |

* cited by examiner

DEVICE FOR CONTROLLING ANGULAR POSITION OF TURBINE BLADES OF A PROPELLER DEVICE

CROSS-REFERENCE TO RELATED PATENT APPLICATIONS

This application is a national phase of PCT application no. PCT/IL2013/051017 filed Dec. 10, 2013, which claims priority to provisional patent application No. 61/831,183 filed on Jun. 5, 2013, all of which are incorporated herein by reference in their entirety.

FIELD OF THE INVENTION

The present invention generally relates to turbines and propeller devices, provided with blades, which when rotated capable to transmit forces to and from a fluid medium. In particular the present invention relates to devices capable of controlling angular position of blades of a propeller or a turbine.

BACKGROUND OF THE INVENTION

The blades of a propeller device are typically symmetrically arranged on a shaft around a central rotational axis to allow the blades to rotate around that axis. Depending on the purpose and design of the propeller device, the blades are rotated either by the flow of a fluid (e.g. gas or liquid) passing therethrough and/or by a motor or by a manually powered mechanism. Here the term "turbine blades" will be used for designating working blades of the propeller device, i.e. those blades, which upon exposure to the flow of fluid transmit forces to and from the fluid medium. So for example when the fluid is air and when the propeller device is an aircraft rotation of the turbine blades create thrust enabling propelling the aircraft.

In aerodynamics an angular position or inclination between a chord of a turbine blade and direction of flow of fluid is known as angle of attack. The value of this angle is important for proper and efficient functioning of a propeller device.

Blades inclination adjusting mechanisms are commonly used in propeller device for setting a predefined angle of attack. By virtue of this provision efficiency of the propeller device can be significantly improved, e.g. by reducing drag as it is known in aircrafts or watercrafts.

There are known in the art various attempts to provide automatic control of angular position of the blades for setting the desired inclination angle. Most known control systems for adjusting the inclination angle of blades, which include dedicated sensors configured for sensing direction and intensity of incoming fluid flow and reporting this data to a central unit which controls the turbine blades and adjust their angular position accordingly.

In propelling devices such as aircrafts or watercrafts in which one or more turbine assemblies are used for propelling a vehicle, hydraulic control mechanisms are used for gaining or reducing thrust by changing the attack angle of the propeller blades.

In many systems such as aircrafts and wind turbines adjustment of angular position of the blades is effected by forcible pivoting the blades, wherein each blade is rotatable over its corresponding pivot axle.

Below are listed same examples of propeller devices provided with forcible control of blades angular position.

In WO2007012487 is described wind power plant comprising a rotor that is equipped with adjustable rotor blades and a central control device allows adjusting the rotor blades using pitch devices.

In CN101629553 is disclosed wind power plant comprising plurality of rotor blades, a blade inclination drive, a rotor shaft, an electric generator, and a control unit for controlling the operation of the power plant, in particular for adjusting the blade inclination under the control of the control unit.

There are known also propeller devices, devised for automatic self-adjusting the blade inclination angles depending on centripetal forces applied to auxiliary masses.

In US2012/0014794 is disclosed a self-setting and self-powered system for adjusting the blades inclination of a wind turbine such that they have a high angle of attack when parked to promote early start up, move to their ideal setting angle for normal running and feathers the blades to limit the rpm and reduce load in storm condition.

In AU-331695/84 is described a load sensing propeller for use in marine craft. The inclination of the blades can be automatically adjusted such that the propeller performs effectively in a variety of operative conditions, e.g. in getting a craft underway and in maintaining cruise speed.

In U.S. Pat. No. 4,693,671 is described reversible self-adjusting propeller device, in which there are provided control blades and thrust blades connected together and pivotally mounted on a hub. In response to variation of load acting on the device the control blades automatically pivot in relation to the hub axis at generally constant angle and this causes corresponding pivoting of the thrust blades. In this propeller device the thrust blades are mounted on the hub in such a manner that they can pivot on their axles and accordingly their angular position can vary when they are exposed to flow of fluid. Furthermore, the control blades are pivotally mounted on their axles while their axles can displace within elliptical wedge-shaped recesses made in the hub. As a result the thrust blades pivot at a changing inclination angle in relation to the hub axis while the control blades do so at a generally constant angle. As a consequence of this design the angular position of the thrust blades is controlled not solely by angular position of control blades and it is not possible to unequivocally set and maintain the desired angle of attack of the thrust blades.

In general one can see that despite numerous attempts to devise inclination control for propeller device, this long felt problem still requires proper solution.

SUMMARY OF THE INVENTION

According to one aspect of the invention, there is provided a device for control of an angular position of turbine blades of a propeller device, wherein the turbine blades are rotatable about a rotational axis and are pivotally displaceable about their respective pivot axes, the device comprising: (a) a set of control blades connected with the turbine blades and pivotally displaceable about respective pivot axes thereof when propeller device is exposed to a flow of fluid; and (b) a transmission unit configured for transmitting pivotal displacement of the control blades to the turbine blades such that turbine blades could be pivoted in respect to their pivot axes by the control blades via the transmission unit, wherein pivoting of the turbine blades takes place simultaneously with pivoting of the control blades, wherein the arrangement of the control blades being such that an angle of attack of the turbine blades is set and maintained automatically by the control blades irrespective of direction of the fluid flow.

Optionally, the set of control blades comprises at least two control blades, which are disposed symmetrically and oppositely with respect to the rotational axis. The control blades may be defined by an upper surface and by a lower surface, wherein the control blades are optionally disposed with respect to the rotational axis such that the upper surface of one control blade and the lower surface of an opposite control blade face to the same direction, while the lower surface and the upper surface of the second control blade face to an opposite direction. Additionally or alternatively, the control blades are situated with respect to the rotational axis such that the control blades would pivot until respective rotational moments arising due to the flow of fluid and applied to the control blades are mutually compensated.

According to some embodiments, the device controls two turbine blades, each of the turbine blades is secured to a pivot axle and is disposed with respect thereto such that pivoting axis of the turbine blade passes through a pressure center of the turbine blade, the arrangement being such that an angular disposition of the turbine blade by the control blades set via the transmission unit remains invariant irrespective of direction of the flow of fluid.

Optionally, the turbine blades are secured on their corresponding pivot axles with possibility for disconnection, such that position of each turbine blade with respect to its pivot axle could be adjusted.

According to any one of the possibilities above or a combination thereof, the relative angular position of each of the turbine blades with respect to the control blades could be adjusted via adjustment means.

According to some embodiments, the adjustment of relative angular position of the turbine blades comprises setting the turbine blades at a desired angle of attack. The angle of attack may be for many aerodynamic or hydraulic systems 6 degrees.

Optionally, the turbine blades and the control blades are rotatable about the same rotational axis within the same plane.

Additionally or alternatively, the turbine blades and the control blades are rotatable about rotational axes that are not within the same plane (non-coplanar). In this case, the transmission unit comprises a first set of gears, a second set of gears and a transmission shaft. According to some embodiments, the first set of gears comprises primary gears each of them being rigidly secured on pivot axles of a respective control blade, a secondary gear, being secured on an end of the transmitting shaft and the second set of gears comprises a primary gear being rigidly secured on an opposite end of the transmission shaft, the primary gear being in engagement with secondary gears each of them being rigidly secured on a pivot axle of a respective turbine blade, the arrangement being such that pivoting of the control blades causes simultaneous pivoting of the turbine blades in the same direction and at the same extent.

Additionally or alternatively, the transmission unit comprises primary gears, each of them being rigidly secured on the pivot axle of respective control blade, an intermediate gear, which is in engagement with the primary gears and with secondary gears, each of them being rigidly secured on the pivot axle of respective turbine blade, the arrangement being such that pivoting of the control blades causes simultaneous pivoting of the turbine blades in the same direction and at the same extent.

According to some embodiments, the control blades are configured and dimensioned such that they are smaller than the turbine blades.

Optionally, the device for control of angular position of turbine blades comprises a limiter of pivoting of the turbine blades. In some embodiments the device further comprises a hub adapted to carry the control blades and the turbine blades, wherein the limiter is configured as a rod releasably secured on a butt end of the hub.

Optionally, the propeller device is selected from a group consisting of a wind turbine, a hydraulic turbine, an airplane, a turbojet, a helicopter, a ship, a submarine, a torpedo, a motor boat, a dirigible, a turbine pump and a turbine compressor.

Optionally, pivoting of the turbine blades takes place in the same direction with the control blades and at the same pivoting angle thereof.

Additionally or alternatively, the pressure center (PC) of each of the turbine blades is located over the pivot axis thereof, and the pressure center (PC) of the control blades is offset from their pivot axes.

According to other aspects of the present invention, there is provided a propeller device for control of angular position of turbine blades thereof in response to fluid flow applied thereover, the propeller device comprising: (a) a set of turbine blade, which are rotatable about a rotational axis and are pivotally displaceable about their respective pivot axis; (b) a set of control blades connected with the turbine blades and pivotally displaceable about a respective pivot axis when propeller device is exposed to a flow of fluid; and (c) a transmission unit configured for transmitting pivotal displacement of the control blades to the turbine blades such that turbine blades could be pivoted in respect to their pivot axis, by the control blades via the transmission unit, while pivoting of the turbine blades takes place simultaneously with pivoting of the control blades, wherein the arrangement of the control blades being such that an angle of attack of the turbine blades is set and maintained automatically by the control blades irrespective of direction of the fluid flow.

The present invention has only been summarized briefly. For better understanding of the present invention as well of its embodiments and advantages, reference will now be made to the following description with reference to the accompanying drawings.

BRIEF DESCRIPTION OF THE DRAWINGS

FIG. 1A shows an isometric view of the turbine system; and FIG. 1B shows schematically how pivot axel of turbine blade is located with respect to pressure center of the blade.

FIG. 5A shows the control blades of the pitch control device in a first angular position; FIG. 5B shows the control blades of the pitch control device in a second angular position; and FIG. 5C shows the control blades of the pitch control device in a third angular position.

FIG. 6A shows the system in a specific blades position where there is no external flow of fluid attacking the blades other than thrust caused by the rotation of the turbine blades; FIG. 6B shows the system in blades position in which a frontal wind attacks the control blades and the turbine blades are rotated via the central main rotation shaft by an engine connected thereto.

FIG. 7A shows an isometric view of the aircraft having two turbine systems installed therein; FIG. 7B shows a front view of the aircraft FIG. 10C shows a side view of the aircraft.

FIG. 8A shows an side view of the turbine system; FIG. 8B shows an isometric view of the turbine system for showing the gear transmission unit thereof; and FIG. 8C shows an elevated inner view of the transmission unit of the turbine system.

DETAILED DESCRIPTION OF SOME EMBODIMENTS OF THE INVENTION

Figure 1A:
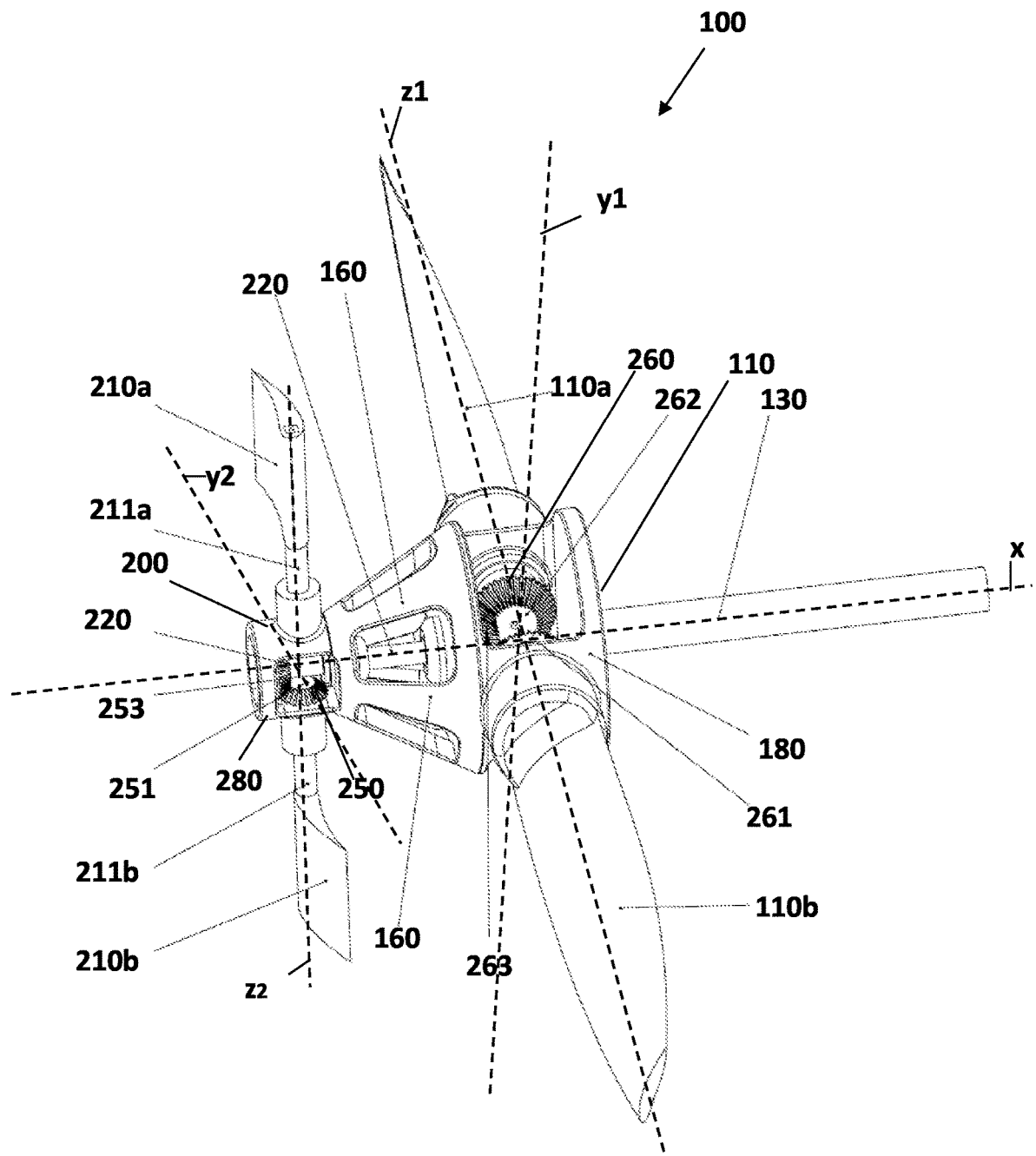
FIGS. 1A-1B show a turbine system that includes a turbine assembly having turbine blades and a pitch control device having control blades, according to some embodiments of the present invention.

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

Here under the term propeller device, is meant a rotary machine having at least one propeller, which is provided with at least one blade rotatable about a rotational axis around which the blades are arranged. Such propeller devices can be used for various purposes, e.g. for converting energy of a flow of fluid medium to which the propeller device is exposed. Here by the term fluid medium is meant both liquid and gaseous matter, e.g. water or air. Accordingly the present invention could be used with such propeller devices like turbines in wind power plants or in hydroturbine power plants for producing electrical energy.

Among various vehicles, in which the present invention can be used are aircrafts or watercrafts, e.g. airplanes, turbojets, helicopters, marine ships, submarines, torpedoes, motor boats, dirigibles, etc.

Still further propeller devices in which the present invention can be used comprise pumps, ventilators, devices for accurate measuring of direction of a fluid flow, etc.

In the further disclosure the broad term "propeller device" will be used along with the term "turbine assembly" for designating various types of propeller devices.

Objects of the Present Invention

The main object of the present invention is to provide an improved control device which would reduce sufficiently or overcome the drawbacks of the known in the art solutions.

In particular the first object of the invention is to provide a new and improved inclination control device, which would be suitable for setting and maintaining a desired angle of attack irrespective of direction of flow of fluid acting on the turbine blades of propeller device.

Still further object of the present invention is to provide a new and improved control device, which would be self-adjusting and capable to set the desired angle of attack automatically irrespective of direction of flow of fluid acting on the turbine blades of propeller device.

Yet another object of the present invention is to provide a new and improved control device, which would be capable to automatically set the desired angle of attack solely depending on direction of flow of fluid acting on the propeller device.

The other object of the present invention is to provide a new and improved control device, which would be capable of setting and maintaining the desired angle of attack of turbine blades accurately and by virtue of mechanical means.

Still further object of the present invention is to provide a new and improved control device, which could be implemented either as a sole, add-on control device suitable for easy and convenient installing in an already existing propeller device, or alternatively which could be an integral part of a new propeller device, being designed.

The present invention, in some embodiments thereof, provides systems and devices for automatic control of inclination of blades of a propeller device, in particular of a turbine assembly, in some cases for obtaining a predefined angle of attack of the turbine assembly blades, according to system requirements, once in operation and also when not in operation.

In the further disclosure the term "angle of attack" (AOA) of a blade of a propeller device refers to an angle between chord line of the blade and direction of a flow of fluid acting on the blade.

The term "pitch angle" refers to an angle between longitudinal axis of the propeller device and horizon.

In the further disclosure the term "inclination control" or simply "control" refers to adjusting the angular position of the blades in respect to its initial angular position in respect to pivot axis of the blade.

A basic concept of the present invention is briefly summarized below. According to this concept propeller device is provided with turbine blades, which provide thrust to the propeller device and with control blades, which control angular position (inclination) of the turbine blades. The turbine blades and the control blades are rotatable about rotational axis of the propeller device and are pivotable about their respective pivot axes. Each turbine blade is secured on its pivot axle with possibility for pivoting. The particular location of turbine blades with respect to their pivot axles is selected such that blade pivot axis passes through center of pressure of the blade.

Here as known in aerodynamics by the term "center of pressure" is meant the point where the total sum of a pressure field acting on a body, causing a force to act through that point. By virtue of this provision the total force vector acting on each turbine blade when the propeller device is exposed to flow of fluid would be applied along the pivot axis of the blade. By virtue of this provision the turbine blades when they are exposed to the fluid flow would not pivot.

In contrast to this, the control blades are pivotably secured on their axles in such a manner that direction of total aerodynamic/hydrodynamic force vector arising due flow of fluid would be offset with respect to pivoting axes of the control blades.

By virtue of this provision the control blades when exposed to flow of fluid would be forced by this vector to pivot until angle of attack is set.

The control blades are preferably arranged in pairs and symmetrically and oppositely with respect to rotational axis of the propeller device. The control blades are provided with appropriate airfoil/hydrofoil, which is defined by a lower and by an upper surface. The control blades are disposed on their pivot axles such that upper surface of one control blade faces direction of the trust, while upper surface of the opposite control blade faces the opposite direction. By virtue of this provision rotational moments arising when control blades are exposed to flow of fluid and acting on each control blade compensate each other.

The control blades and the turbine blades are kinematically connected therebetween by a transmission unit which translates pivoting of control blades to pivoting of turbine blades. Seeing that total aerodynamic/hydrodynamic force vector is applied to respective pivot axes of turbine blades they would be forcibly displaced solely by the control blades and not by the flow of fluid. The turbine blades would be pivotably displaced by the control blades at exactly the same inclination angle (angle of attack) as the control blades, irrespective of direction of flow of fluid to which propeller device is exposed.

By virtue of this provision current angular position of the turbine blades would be automatically controlled and set solely by the angular position of the control blades. One could appreciate that the control blades in fact would be functioning as very simple mechanical sensor, which automatically sets the angle of attack of the turbine blades. Since the current angle of attack of the control blades would be set accurately the angular position of the control blades could be used for accurate measuring of direction of the flow of fluid, e.g. direction of an apparent wind.

A turbine assembly may include one or more sets of multiple blades symmetrically arranged and rotatable over a predefined rotation axis, where the propeller device serves for any known in the art purpose such as for propelling a vehicle such as an aircraft e.g. an airplane or a helicopter, or for propelling a watercraft, for energy conversion and utilization such as for exerting wind or water flow energy such as for a wind turbine and the like.

In case of propelling a vehicle the blades are rotatable via a drive shaft rotated by an engine mechanism, whereas in case of wind or water turbines the drive shaft connected to the turbine assembly is only rotatable via the external forces applied over the turbine assembly's blades and transmits this rotational movement to other one or more mechanisms for converting and/or utilizing the energy from the rotation of the blades.

According to some embodiments there is provided a turbine system including a turbine assembly and inclination control device operatively engaging thereto, where the turbine assembly includes multiple turbine blades symmetrically arranged over a predefined central rotation axis defining thereby a first rotational plane of the turbine assembly. The control device of the turbine system is configured for automatic sensing effective forces of fluid or gas from the external environment of the turbine system flowing therethrough and mechanically adjusting the angular positioning of the turbine blades in response via a transmission mechanism that mechanically transmits the pivotal movement of the control blades to the turbine blades to adjust angular positioning thereof.

For example, for airplane propelling, the pitch control is designed for adjusting the angular position of the turbine blades to an optimal position during flight such as to ensure minimum drag of the turbine blades for requiring minimum engine effort (torque applied over the drive shaft rotating the turbine blades) for achieving the same flight speed, for instance, by having the angular positioning of the turbine blades at an angle that ensures maximal thrust produced thereby with the same torque applied by the motor.

According to some embodiments adjustment of the angular position of the turbine blade changes the aerodynamics of the turbine blade and defines how the turbine blade resists and/or is rotated by the incoming flow of a fluid.

According to some embodiments of the invention, the inclination control device includes: (i) a set of control blades, each control blade having smaller surface area than the turbine blade, where each control blade is pivotally connected to a corresponding control blade axle arranged over a central axis; and (ii) a transmission unit engaging both the control as well as the turbine blades and being configured for mechanically transmitting rotation of the control blades to the turbine blades for adjusting the angular positioning of the turbine blades according to the angular position of the control blades. The control blades are rotated over their axles by a fluid flowing therethrough, causing the turbine blades to change their angular position in response to rotation of the control blades. The transmission unit is configured for changing angular position of the turbine blades solely due to changing of angular position of the control blades. By virtue of the transmission unit the turbine blades are forced to change their angular position simultaneously with the control blades, at the same rate and in the same direction as the control blades.

According to some embodiments, when equilibrium of moments acting on the control blades is reached (an angular position of control blades in which superposition of rotational moments applied on them is nulled) they would be brought in angular position corresponding to optimal angle of attack and accordingly the turbine blades would be brought to the same angle of attack (AOA). The relative angular disposition of the control blades and the turbine blades can be varied, such that angular position of the turbine blades would be set at a desired angle of attack.

In practice this optimal angle of attack is about 6 degrees. Once the turbine blades were brought in an angular position corresponding to the desired AOA (this is carried out in advance, before operating the propeller device) this angle of attack will be unequivocally maintained irrespective of direction of flow of fluid, to which the propeller device is exposed.

Therefore, control of angular position of the turbine blades will be effected by simple mechanical means, automatically and in self-adjusting mode.

The equilibrium of moments acting on the control blades is achieved by securing a pair of control blades on their respective pivot axles such that their either upper or lower surfaces would be facing in opposite directions, meaning that when upper surface of one control blade faces one direction, e.g. thrust direction the upper surface of an opposite control blade faces the opposite direction. This disposition would be referred to further as an "inverse" disposition.

The control blades may be located in the same rotational plane as the turbine blades and in an alternating manner meaning that each control blade would be located between two turbine blades and vice versa in a symmetrical arrangement.

Cross-section of each of the turbine blades (aerofoil/hydrofoil) may be aerodynamically or hydrodynamically configured and dimensioned to achieve the best operational functionality in various operation modes of the propeller device.

So, for example, for a helicopter turbine system the turbine blades could be designed for optimal lift and thrusting, while for a wind turbine it could be designed for optimal energy exertion/absorption.

In some cases the turbine blades may have a convoluted shape meaning that one surface of the blade is curved to one direction and the other to an opposite direction with respect to blade's chord, whereas in other designs the turbine blades may be either concaved having a single camber in respect to the chord of the blade or be flat. The control blades may be flat, concaved or convoluted depending on the system's aerodynamic/hydrodynamic requirements.

The turbine blades size and their shape differs from the control blades as each serve a different purpose. The number of turbine blades and control blades may vary from one system to another and this number does not have to be even and doen not have to be equal, meaning that the number of turbine blades may or may not be the same as the number of control blades.

According to some embodiments, the control blades are positioned angularly with respect to the axis of rotation of propeller device forming an angle "α" therewith, where 180>α>0.

According to some embodiments, the design of the control device is such that the pressure center (PC) of each of the turbine blades is located over the pivot axis of the respective turbine blade, and the pressure center (PC) of each of the control blades is offset from its respective pivot axes.

Reference is now made to FIGS. 1-6B, schematically illustrating a turbine system 100 capable to control angular position of turbine blades of propeller device automatically and by simple mechanical means according to some embodiments of the invention. The turbine system 100 comprises (a) a turbine assembly 110 and (b) a control device 200 configured for sensing flow conditions such as air flow or water flow applied to the turbine assembly 110 and automatically adjusting the angle of attack of turbine in real time.

According to some embodiments, as illustrated in FIGS. 1, 3-4 and 9A-9B the turbine assembly 110 includes two turbine blades 110*a* and 110*b,* each pivotably rotatable about their pivot axes Z1,Z1' on a corresponding turbine blade axle 111*a* and 111*b,* respectively, a main drive shaft 130 and a rear portion 180 of a hub housing. The turbine blades 110*a* and 110*b* are rotatable over a central rotation axis x and their rotation defines a rotational plane Y1-Z1, which is angular (e.g. perpendicular) to the central axis x.

According to some embodiments, as illustrated in FIGS. 1, 3-4 and 9A-9B, the pitch control device 200 includes a set of control blades 210*a* and 210*b* each pivotably rotatable about their pivot axes Z2,Z2' on a corresponding control blade axle 211*a* and 211*b* respectively, and a transmission unit 220 configured for mechanically and automatically transmitting torque from the control blades 210*a* and 210*b* to the turbine blades 110*a* and 110*b* of the turbine assembly 110 at any given moment for maintaining the angle of attack (AOA) of the turbine blades 110*a* and 110*b* at an optimal value by adjusting the angular positioning i.e. the pitch angle of the turbine blades 110*a* and 110*b*.

According to embodiments illustrated in FIGS. 1-6B, the control blades 210*a* and 210*b* are symmetrically arranged over a central axis (in this case the same central axis x as that of the turbine assembly 110), around which they rotate and by having each control blades 210*a* and 210*b* being of an invert positioning as shown in FIG. 1, in which their respective upper and lower surfaces face opposite directions.

According to the embodiments illustrated in FIGS. 1-6B, the set of control blades 210*a* and 210*b* is located in front of the turbine blades 110*a* and 110*b* set. A rotational plane y2-z2 defined by the rotation of the control blades 210*a* and 210*b* is parallel and at a distance from the plane y1-z1 defined by the rotational movement of the turbine blades 110*a* and 110*b* (see FIG. 1).

In this example, the control blades 210*a* and 210*b* have a concaved cross-section but in other embodiments they may have other aerodynamic or hydrodynamic configuration depending on system requirements.

According to some embodiments, as shown in FIGS. 1-6B, the control blades 210*a* and 210*b* are significantly smaller in dimensions and have smaller surface area than the turbine blades 110*a* and 110*b* to prevent them from introducing significant lift or drag to the system 100, especially but not exclusively for propelling systems. In some cases the ratio between the span (i.e. length) of the control blade 210*a/b* and turbine blade 110*a/b* is 50% or more meaning that each control blade 210*a/b* is either half the length of the turbine blade 110*a/b* or shorter. The control blades 210*a* and 210*b* may also be smaller in width.

The design and installation of the control blades 210*a* and 210*b* in respect to the turbine blades 110*a* and 110*b* is such that flow of fluid such as liquid or gas urges the control blades 210*a* and 210*b* to pivot and accordingly to change angular position (angle of attack) of the turbine blades 110*a* and 110*b*. This is effected by virtue of transmission unit.

According to some embodiments, as illustrated in FIGS. 1, 3-4 and 9A-9B, the transmission unit includes two gear sets: a first gear set 250 and a second gear set 260 operatively connected to one another via a transmission shaft 220 configured for transmitting torque caused by pivoting of the control blades 210*a* and 210*b* to the turbine blades 110*a* and 110*b*. This is done by virtue of the transmission shaft 220*b,* rotated by the first gear set and transmitting rotation to the second gear set 260 for pivoting the turbine blade about their pivot axles 111*a* and 111*b*.

According to some embodiments of the invention, as illustrated in FIGS. 1A, 3-4 and 9A-9B, the first gear set 250 includes three gears (i.e. cogwheels): a couple of main (master) gears 251, 252 and a secondary (slave) gear 253. The second gear set 260 includes three gears (i.e. cogwheels): a main (master) central gear 263, and two secondary (slave) gears 261 and 262. The gears 251 and 252 are rigidly connected to a respective control blade axles 211*a* and 211*b,* to be rotatable thereby. Furthermore, each of the gears 251 and 252 engages the secondary gear 253 for rotating thereof. The secondary gear 253 is rigidly secured on the transmission shaft 220 for transmitting torque thereto. The gears 261 and 262 are rigidly secured on respective turbine blade pivot axles 111*a* and 111*b,* for rotating thereof. Furthermore, each of the gears 261 and 262 engages the main gear 263 for being rotated thereby. The gear 263 is rigidly secured on an opposite end of the transmission shaft 220 for receiving torque transmitted thereby.

Therefore, inclination control is effected by transmission of torque from control blades 210*a* and 210*b* to the turbine blades 110*a* and 110*b* by pivotably displacing them and thereby changing their angular position.

The control blades 210*a* and 210*b* and the gear sets 250 and 260 are installed such that pivoting of the control blades caused by the fluid flow allows maintaining the turbine blades 110*a* and 110*b* at an optimal AOA irrespective of direction of the fluid flow.

In the particular example demonstrated in FIGS. 1-9B, the control blades 210*a* and 210*b* and turbine blades 110*a* and 110*b* are positioned coaxially with respect to rotational axis x, and therefore the control blades 210*a* and 210*b* sense substantially the same flow as they are positioned right in front of the turbine blades 110*a* and 110*b*.

According to some embodiments, as illustrated in FIG. 1A the hub housing comprises a frontal portion 280, an intermediate portion 160 and a rear portion 180, which is rigidly secured on an end of the drive shaft 130 and thus the hub can be forcibly rotated thereby along with turbine blades 110*a* and 110*b*.

According to some embodiments, the turbine system 100 illustrated in FIGS. 1A-9B constitutes a propeller configured for creating thrust for propelling e.g. an aircraft such as an airplane. In this case an engine is provided (not shown) for rotating the drive shaft 130 and the hub along with turbine blades 110*a* and 110*b* for creating thrust thereby, where the inclination control device 200 is configured and located such as to allow automatic sensing of flow of air applied to the control blades 110*a* and 110*b*. This flow is in fact an apparent wind acting on the control blades. Depending on direction of the apparent wind current angular position of the turbine blades 110*a* and 110*b* is automatically adjusted to establish and maintain an optimal AOA typically of 6 degrees.

Figure 1B:
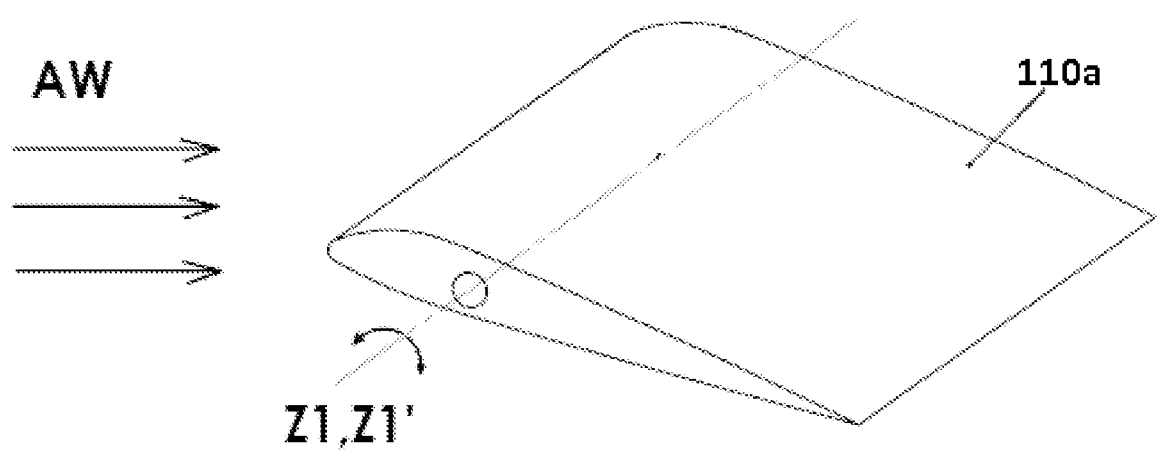

Now with reference to FIG. 1B it would be explained how location of the turbine blades 110*a* and 110*b* is selected with respect to the hub such that their angular disposition would remain invariant irrespective of direction of flow of a fluid, to which the propeller device is exposed.

As schematically shown in FIG. 1B a turbine blade 110*a* is secured on a pivot axle 111*a* with possibility to pivot about its pivot axis Z1,Z1'. The pivot axel 111*a* is located on a butt end of the blade 110*a* such that pivot axis of the blade would pass through pressure center PC of the blade. By virtue of this provision the total aerodynamic/hydrodynamic force vector TAFV/HHFT arising due to flow of fluid, e.g. an apparent wind, would pass through the pivot axis and therefore would not cause pivoting of the turbine blade 110*a*.

Figure 2:
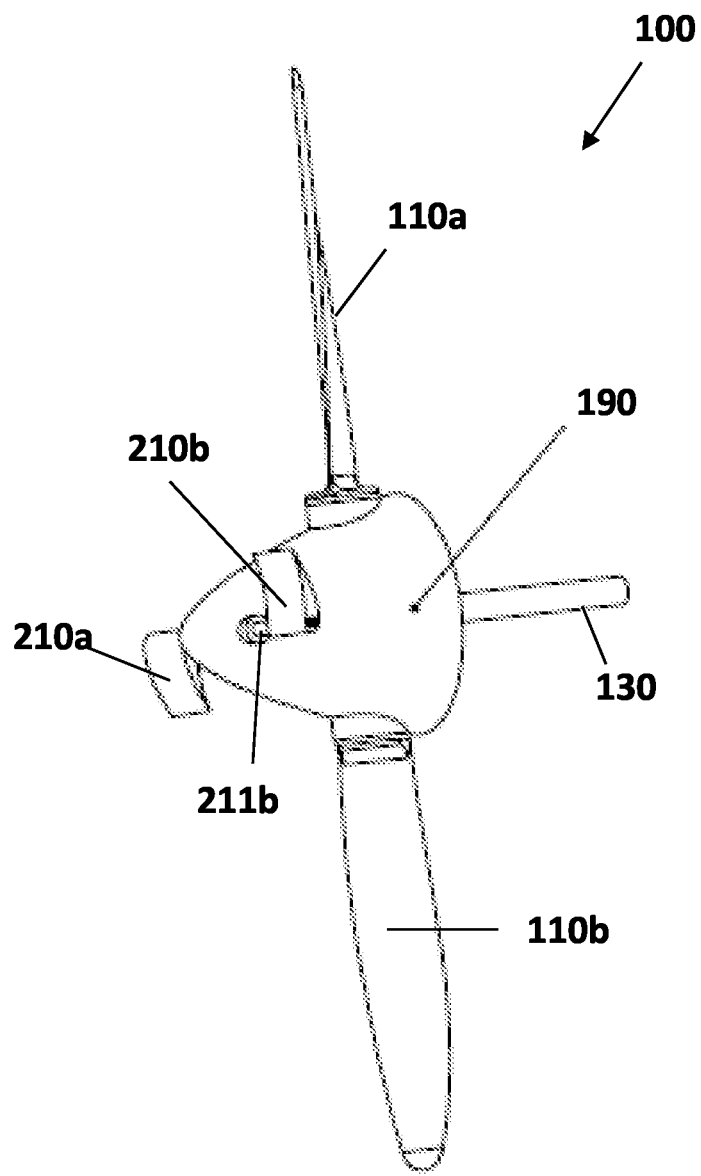
FIG. 2 shows an isometric view of the system having a cover.
Figure 3:
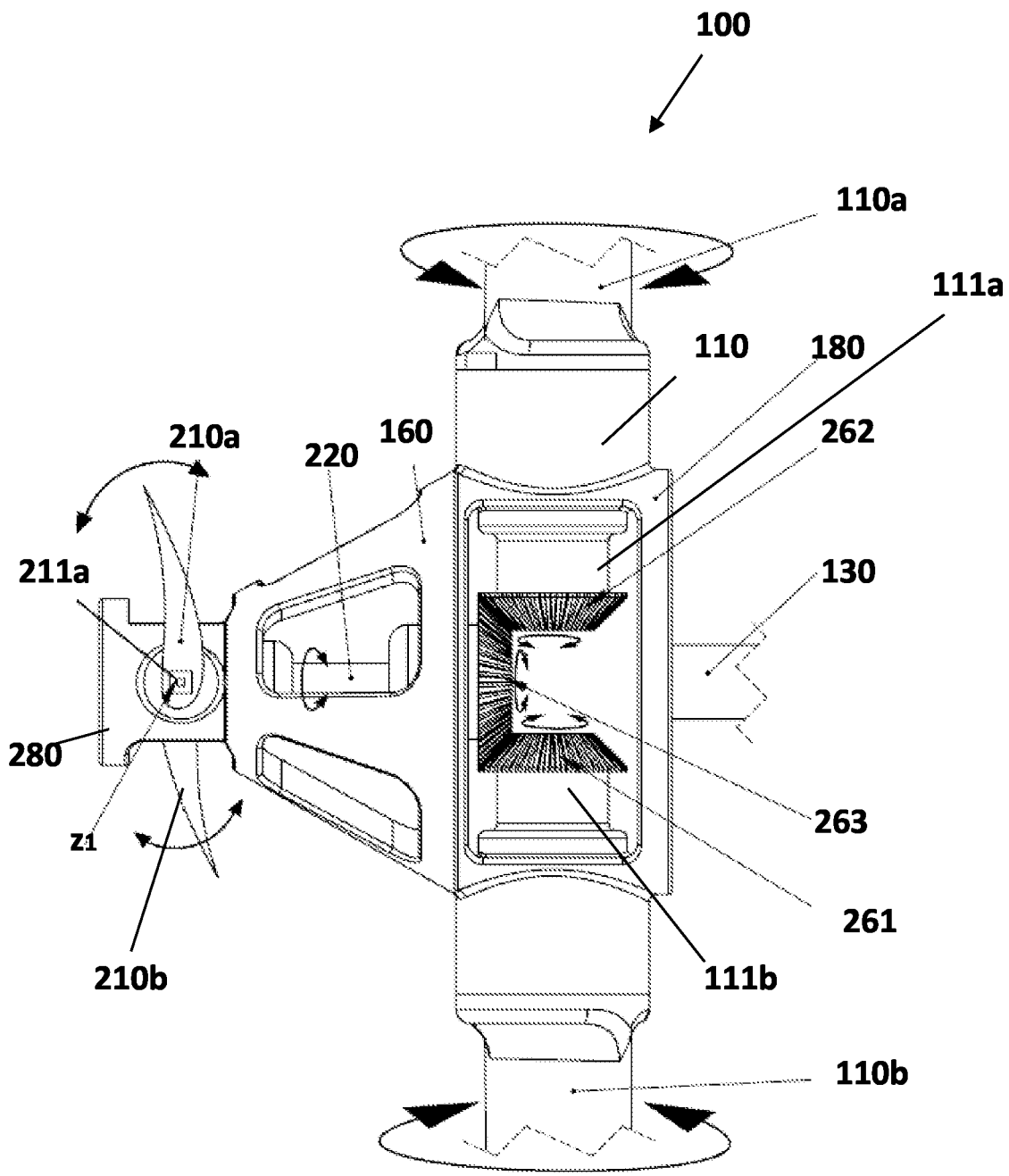
FIG. 3 shows a first side view of the system.
Figure 4:
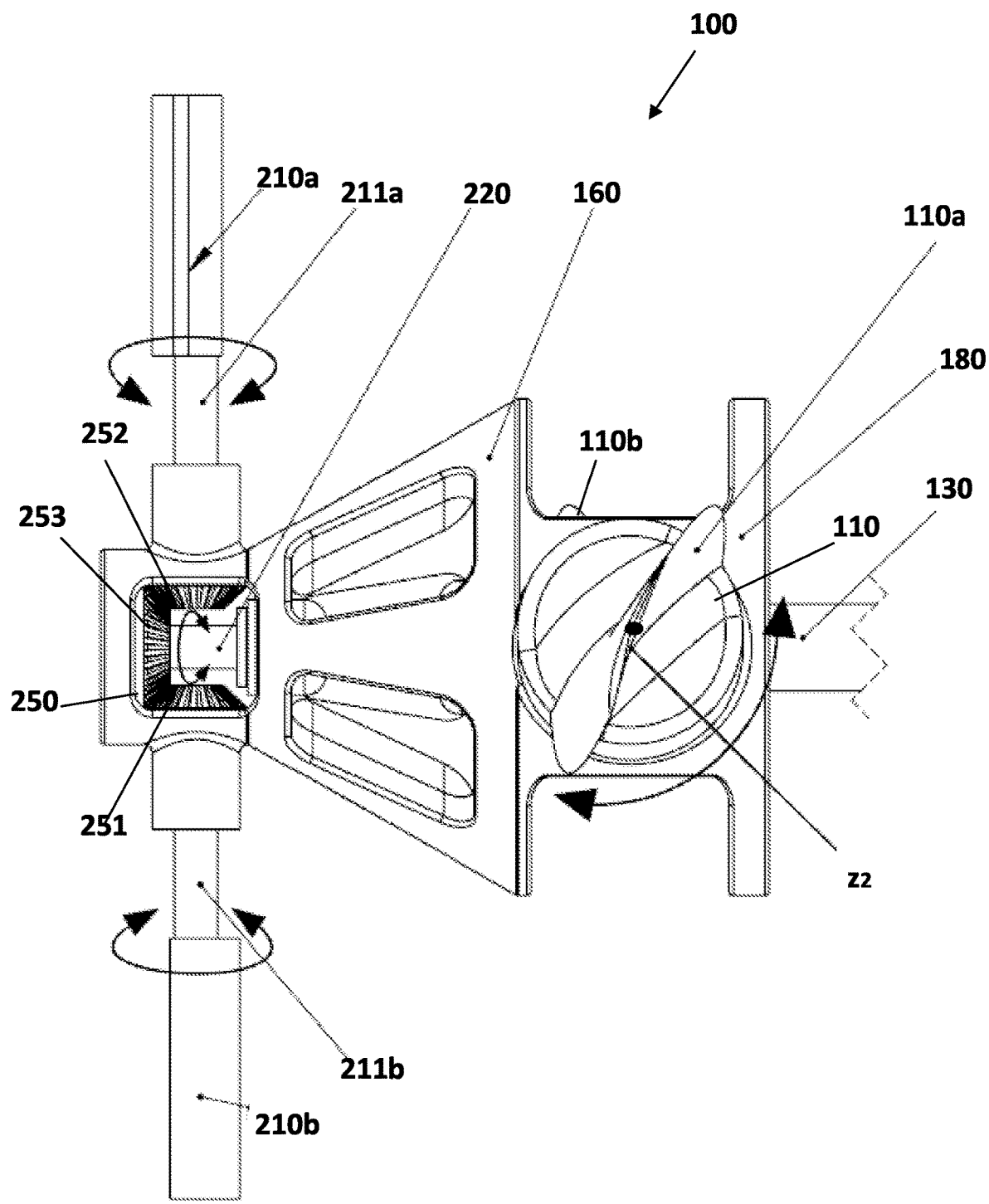
FIG. 4 shows a second side view of the system.

According to some embodiments, as shown in FIG. 2 the hub may be accommodated within an enveloping cover 190.

The turbine system 100 and particularly the inclination control device 200 is designed to achieve maximal energy efficiency from the rotation of the turbine blades 110*a* and 110*b* of the turbine assembly 110 during operation thereof and is also configured for possibility of feathering when the system is not in operation so as to prevent drag.

Figure 5A:
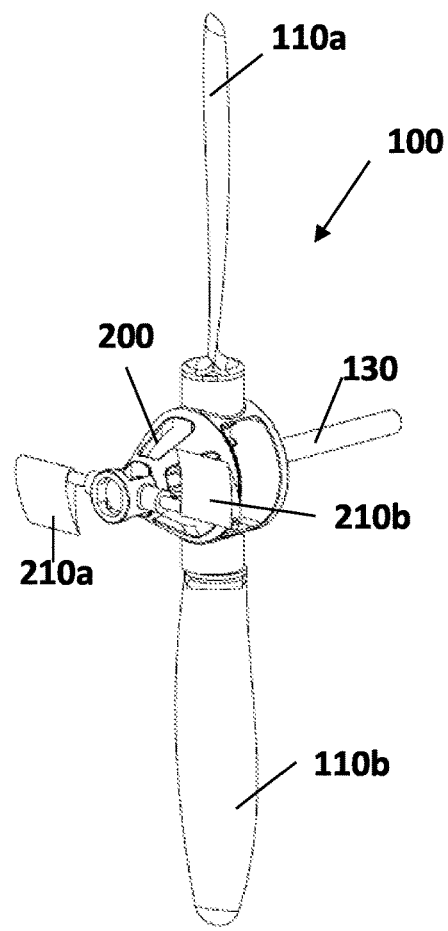
FIGS. 5A-5C show an isometric view of the system having control blades of the pitch control device in three discrete angular positions.
Figure 5B:
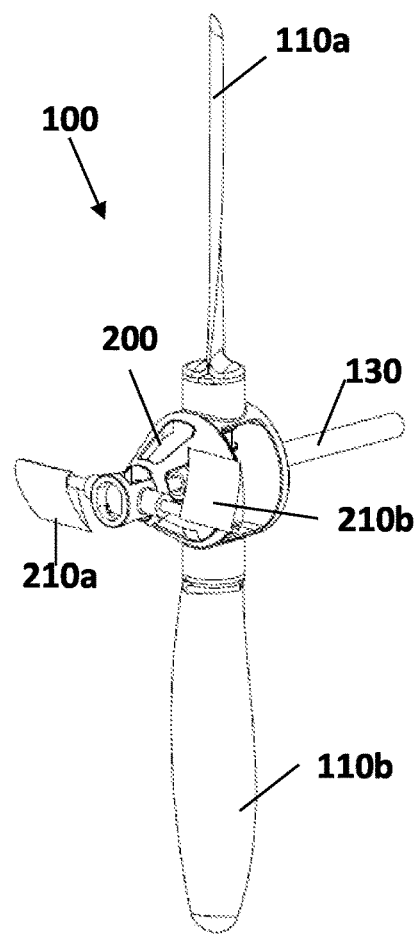
Figure 5C:
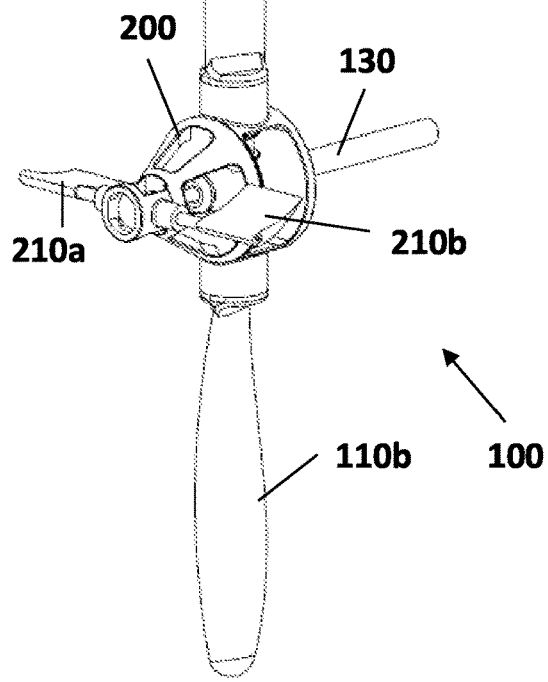

Referring now to FIGS. 5A-5C which show the turbine system 100 used as a propeller system in three optional operation conditions.

FIG. 5A is an isometric view of the turbine system 100 when it spins in a neutral mode of rotation, wherein there is no other force applied to the control blades 210*a* and 210B but only apparent wind caused by the rotation of the turbine blades 110*a* and 110B alone once they are forcibly rotated by the drive shaft 130 driven by an engine.

FIG. 5B is an isometric view of the turbine system 100 in which the turbine blades 110*a* and 110*b* are rotated by the engine while other forces of air flow are applied to the control blades 210*a* and 210B.

Therefore the control blades 210*a* and 210B face the average force vector caused both by the motorized rotation of the turbine blades 110*a* and 110B as well as the external environmental forces arising due to the air flow and causing the angular position of the control blades 210*a* and 210B to change in response to an average force associated with apparent wind and changing the inclination of the turbine blades 110*a* and 110B.

FIG. 5C is an isometric view of a still further configurations of the system 100 in which the turbine blades are in a feathering mode. Since the turbine assembly 110 is not spinning—the only force vector arrives from the front (e.g. a wind blows directly in the direction of the central axis of the turbine assembly 110). In this situation, the control blades 210*a* and 210*b* blades face the frontal incident force vector and their angle of attack resets accordingly as a natural response thereto. In response, the turbine blades' 110*a* and 110B change their angular position accordingly and becomes feathered.

Figure 6A:
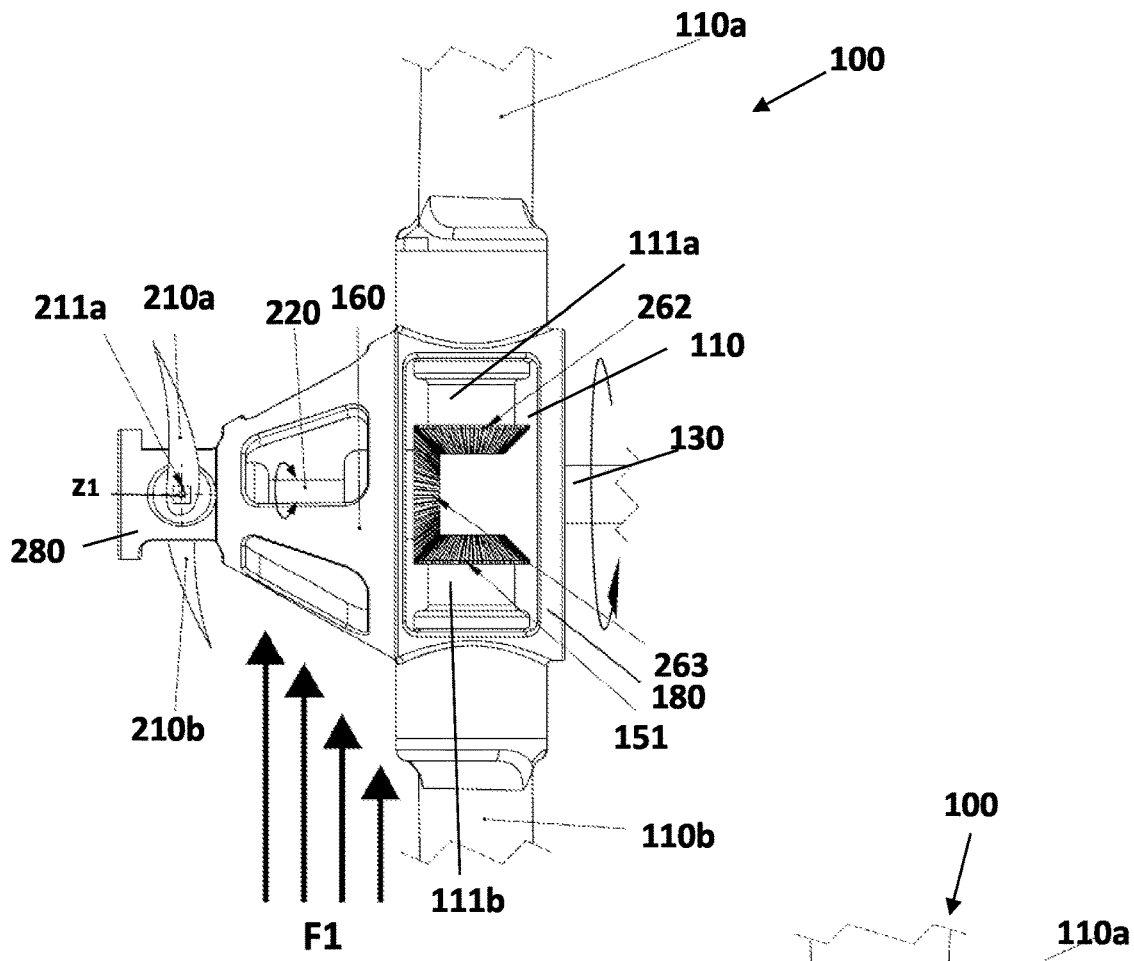
FIGS. 6A-6B show a side view of the system wherein the secondary and turbine blades are exposed or not to flow of fluid arriving from various directions.
Figure 6B:
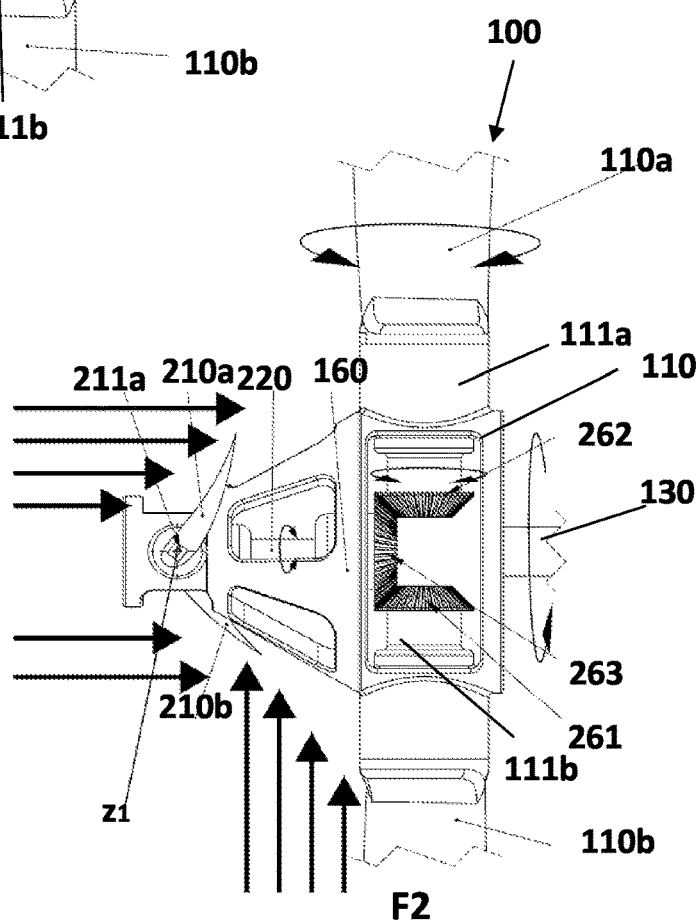
Figure 7A:
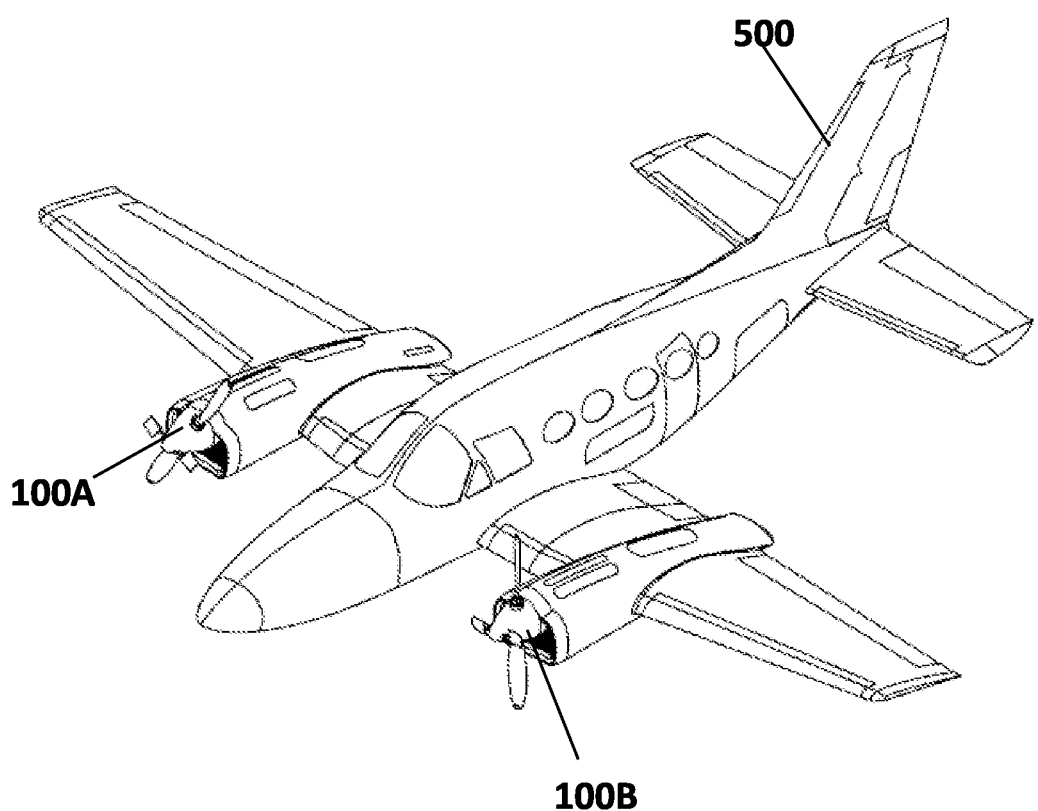
FIGS. 7A-7C show multiple turbine systems installed in an aircraft for propelling thereof.
Figure 7B:
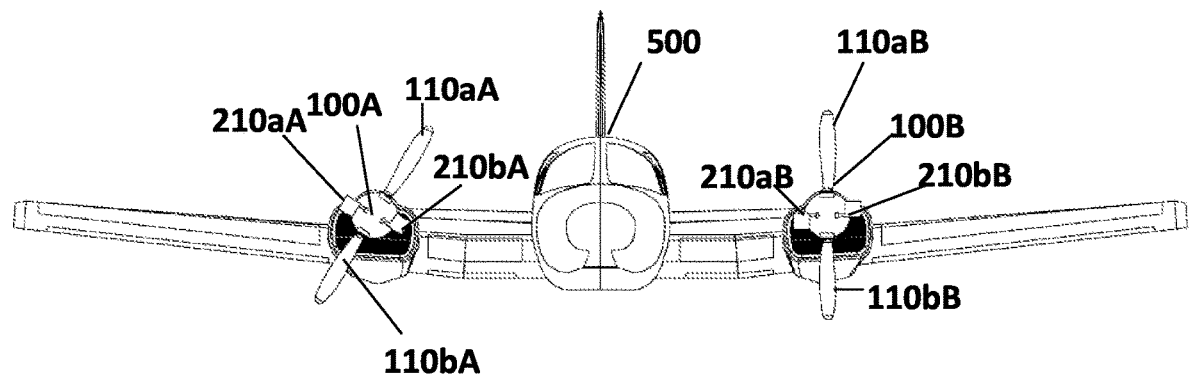
Figure 7C:
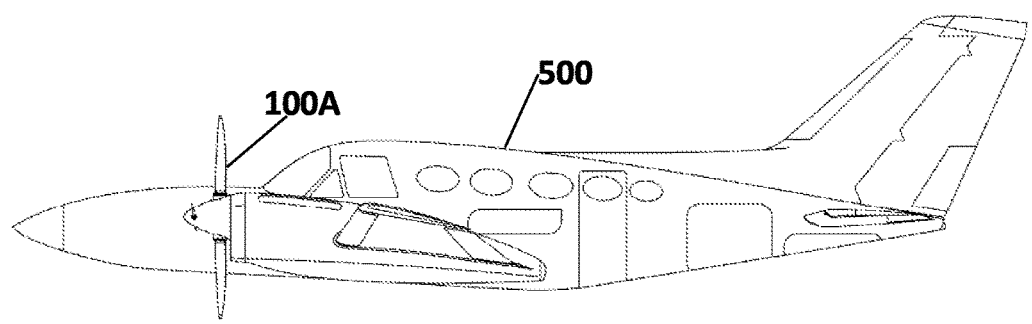

Referring now to FIGS. 6A-6B, which show the turbine system 100 when used as an airplane propeller, wherein the turbine blades 110*a* and 110*b* are rotatable by a motorized mechanism which rotates the drive shaft 130, according to some embodiments of the invention. In a situation depicted in FIG. 6A there is no external force applied and the only force applied to the control blades 210*a* and 210B is the thrust caused by the rotation of the turbine blades 210*a* and 210*b*. The thrust is indicated by "F1" and the four thick arrows. Since direction of the force F1 is perpendicular to the axis of rotation of the control blades 210*a* and 210*b* the AOA of the main thrust blades 110*a* and 110*b* is optimal and equal to that value, which has been set in advance, before operating the propeller device. The control blades 210*a* and 210*b* are turning right into the force and since they are mounted opposite in an inverted position the rotational moments acting on these blades cancel each other.

In FIG. 6B is shown a situation when the turbine blades 110*a* and 110*b* are forcibly rotated by the engine while an external flow of wind and/or other forces are applied to the turbine blades 110*a* and 110*b* (for example- plane is starting to run on runway in order to take of For example, a frontal force F2, which is parallel to the central rotational axis x arises due to a frontal wind. Angular position of turbine blades 110*a* and 110*b* is set accordingly by the control blades 210*a* and 210*b*. The transmission shaft 220 transmits the torque produced by the control blades 210*a* and 210*b*, pivoting due to forces applied thereon to the turbine blades 110*a* and 110*b* through the shaft 220 and this causes changing the angular position of turbine blades 110*a* and 110*b* to maintain the optimal AOA thereof.

In the embodiments illustrated in FIGS. 1-7C there is shown only one pair of control blades 210*a* and 210*b* and one pair of turbine blades 110*a* and 110*b*. However, there may be any even or odd number of any type of the blades, depending on the requirements of the system in which the turbine system is embedded or connected. In any case the control blades may be symmetrically arranged over their center of rotation.

In the embodiments illustrated in FIGS. 1-7C the control blades 210*a* and 210*b* are located at a distance and in front of the turbine blades 110*a* and 110*b*, However, the control blades may be installed at the same plane coaxially to the central axis of the turbine blades for instance in an alternating manner, in which each control blade is located between two turbine blades.

In the embodiments illustrated in FIGS. 1-7C a distance from the distal edge of each of the control blades 210*a* and 210*b* and the control blades' center of rotation is substantially less than a distance between the distal edge of each of the turbine blades 110*a* and 110*b* and the center of rotation of the turbine blades 110*a* and 110*b*. However in some cases this distance may be about the same.

One should bear in mind, that other means for transmitting torque from the control blades to the turbine blades could be used instead of or in addition to the mechanical mechanism explained above. Such means comprise electric means, electronic means and any other means capable of transmitting rotational moment.

Figure 8A:
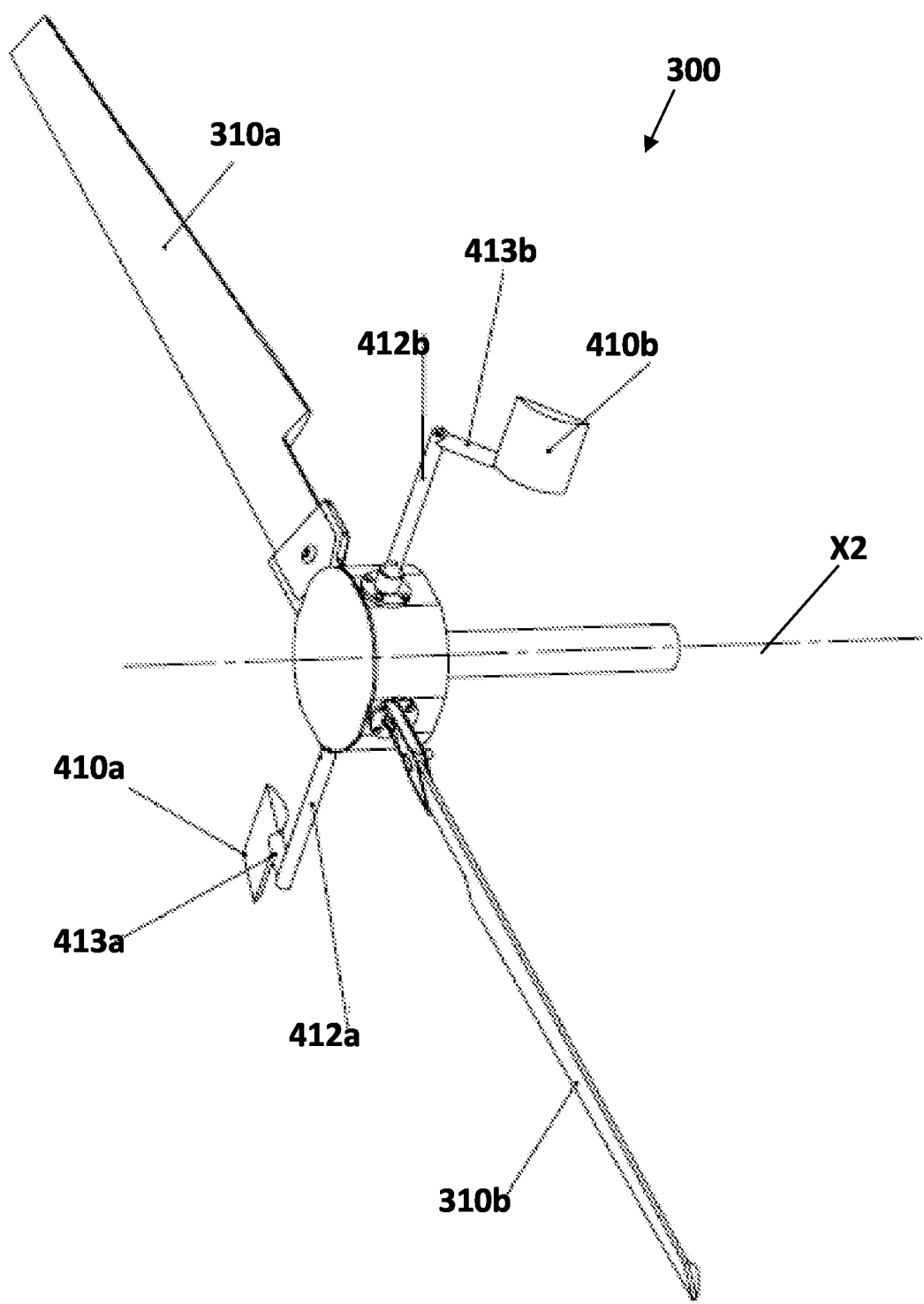
FIGS. 8A-8C show a turbine system having a turbine assembly and a pitch control device blades arranged coaxially and creating a coplanar rotational plane in respect to their mutual axis of rotation, according to other embodiments of the invention.
Figure 8B:
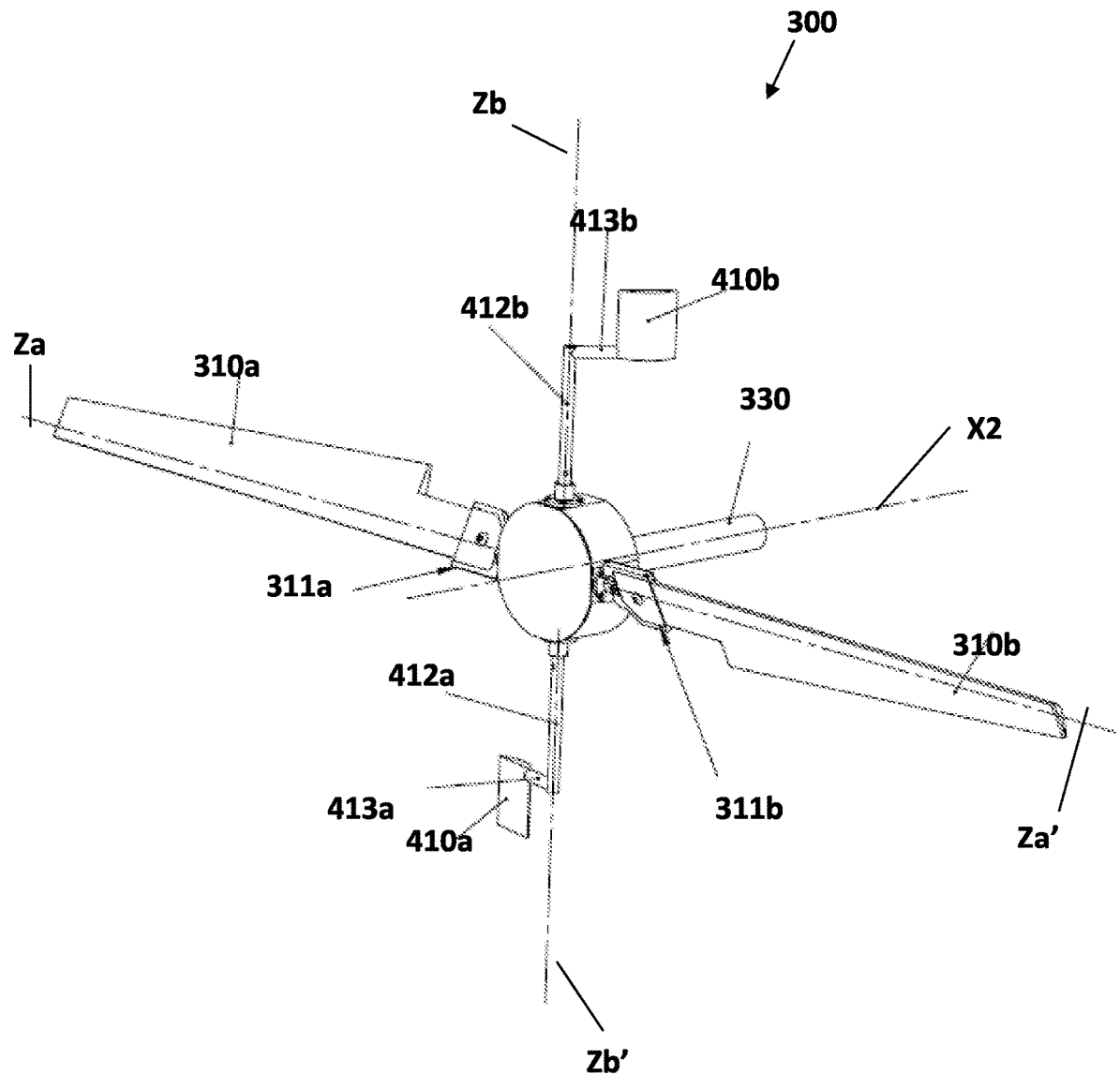

Reference is now made to FIGS. 8A and 8B, which show a turbine system 300 having a hub 360, a turbine assembly with turbine blades 310a and 310b and a pitch control device 400 with control blades 410a and 410b arranged coaxially with the turbine blades and in the same rotational plane with respect to their mutual rotational axis $X_2$, according to other embodiments of the invention.

The turbine blades and the control blades are arranged in an alternating manner such that each control blade is located between two turbine blades and vice versa. The turbine system 300 comprises a frontal hub portion 380 carrying gears for transferring torque from control blades 410a, 410b to turbine blades 310, 310b. The control blades and the turbine blades are arranged with possibility for pivoting. This is possible due to securing the control blades on pivot axles 412a,412b and securing the root portions 311a,311b of the turbine blade on respective pivot axles 320a,320b, respectively, thus to allow changing of the inclination angle of the turbine blades and therefore to adjust and maintain their angle of attack. The hub comprises also a rear portion 360 secured on a forward end of a drive shaft.

Each blade 310a, 310b, 410a or 410b can pivotably rotate about its respective pivot axis Za,Za' or Zb,Zb'. All blades are also rotatable around a central rotational axis $X_2$ According to some embodiments, as illustrated in FIG. 8A, each of the control blades 410a and 410b is connected to the pivot axle thereof 412a and 412b respectively through a shoulder 413a and 413b such that the axle 412a/412b is perpendicular to the shoulder 413a/413b and the shoulder 413a/413b is perpendicular to the control blade 410a/410b. This configuration improves transfer of momentum arising when the control blades are exposed to flow of fluid during operation of the propeller device.

Figure 11:
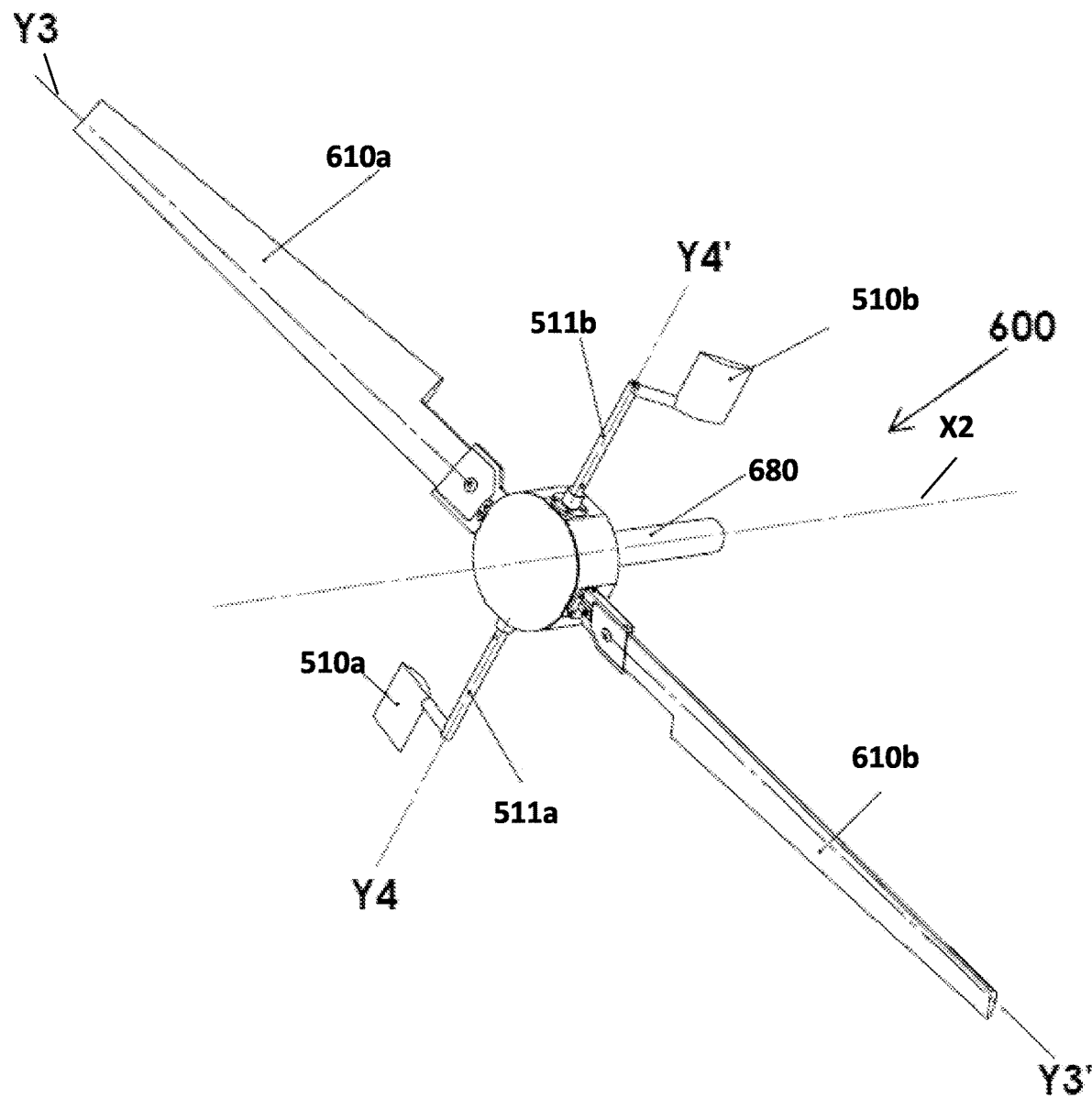
FIG. 11 shows a turbine system having a pitch control device installed therein, according to other embodiments of the invention.

Once a force vector F is applied to the turbine blades 310a and 310b and control blades 410a and 410b of the system 300 as shown in FIG. 11, it will force the control blades 410a and 410b to pivot around their respective pivot axes Zb,Zb' which in turn will cause pivoting of the turbine blades 310a and 310b around pivot axes Za,Za'. The pivoting of the turbine blades is effected by the transmission unit and by virtue of this provision it is possible to control inclination angle of the turbine blades such that optimal AOA would be established and maintained.

Figure 8C:
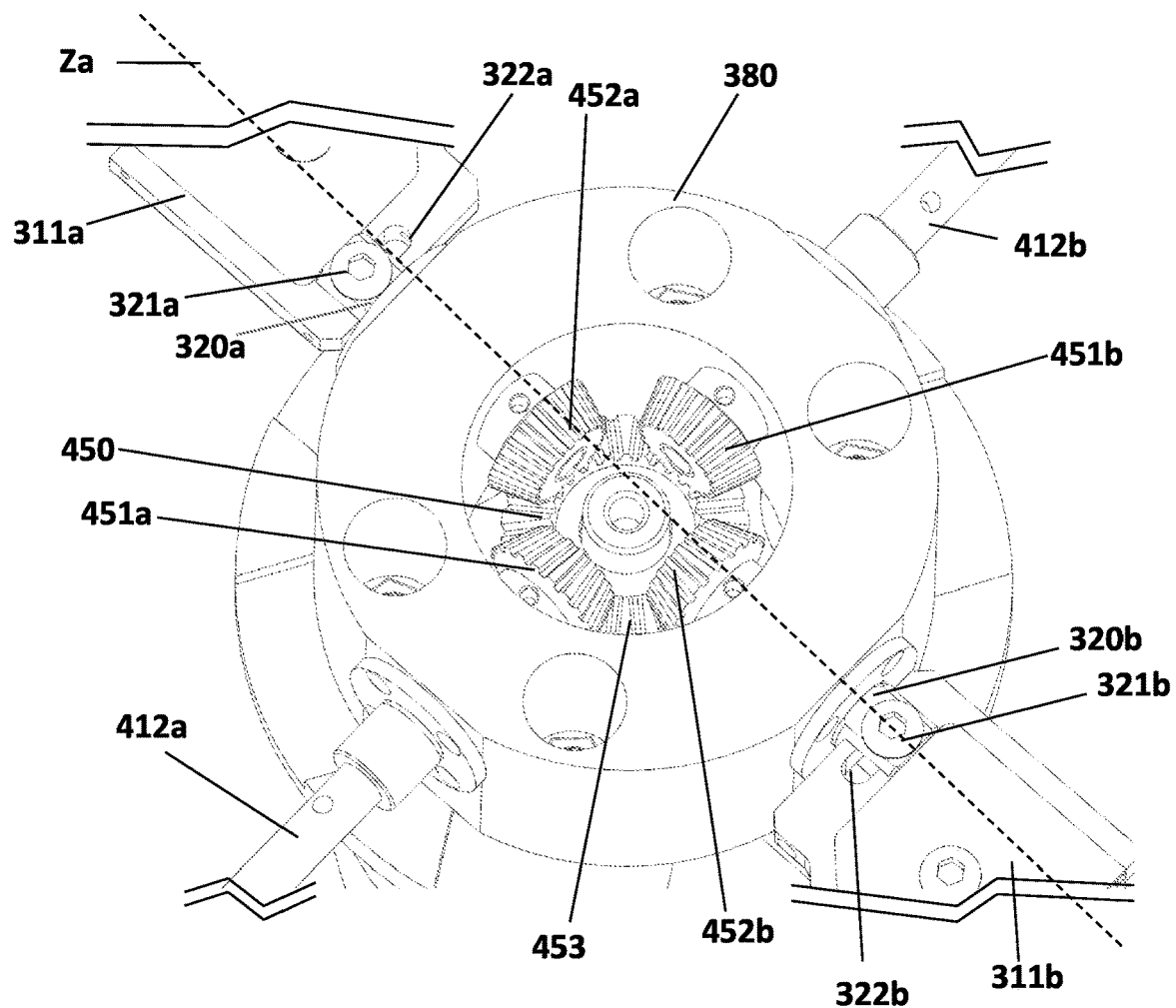

Referring to FIG. 8C the transmission unit comprises a gear set consisting of five gears, 452a, 452b, 451a, 451b and 453. It is seen that gears 451a, 451b are secured on pivot axles 412a, 412b of the control blades and rotatable about pivot axes Zb, Zb'. Gears 452a, 452b are secured on pivot axles 320a, 320b of the turbine blades and are rotatable about pivot axes Za, Za'. The gear 453 is in engagement with the gears 452a, 452b, 451a, 451b and is forcibly rotatable once gears 451a, 451b rotate due to pivoting of axles 412a, 412b. This rotation is transmitted to gears 452a, 452b and by virtue of this provision pivoting of control blades causes pivoting of the turbine blades 310a and 310b.

The control blades 410a and 410b are positioned angularly to the respective pivot axes Zb, Zb' forming an inclination angle "α" therewith, where: 180>α>0.

The turbine blades may be releasably secured on their respective axles 320a, 320b, such that position of each turbine blade can be adjusted with respect to its pivot axle, as will be explained in more details further.

The turbine blades are secured on their pivot axles in such a manner that pivot axes Za,Za' pass through the pressure center of respective blade and by virtue of this provision the total aerodynamic/hydrodynamic force vector is directed along pivot axes Za,Za' and therefore their angular disposition remains invariant and turbine blades 310a and 310b do not or hardly generate torque.

The control blades 410a and 410B on the other hand, are installed such that the total aerodynamic/hydrodynamic force vector is applied outside of their pivot axes.

Thus, the aerodynamic or hydrodynamic force applied over the control blades 410a and 410b causes their pivoting in the direction of decreasing the angle of attack of the turbine blades 310a and 310b. Due to flow of fluid acting on control blades rotational momentums arise, which change angular position of the control blades until the momentums are mutually compensated. Pivoting of the control blades is transmitted by the transmission unit 450 to the turbine blades and their angular position varies until a constant AOA is established and maintained. This AOA can be preset in advance for example to be equal 6 degrees.

As shown in FIG. 8C, the transmission unit 450 ensures simultaneous pivoting of the turbine blades in a coordinated manner with the control blades, in the sense that angular displacement of the turbine blades 310as and 310b will take place simultaneously, in the same direction and at the same angle as the control blades. The magnitude of the angular displacement will depend solely on direction of flow of fluid acting on the control blades.

Now with reference to FIG. 8C it will be explained how position of turbine blades with respect to their pivot axles could be set such that their pivot axes would pass through respective pressure centers and such that their angular inclination could be set to a desired value. In practice this setting is carried out in advance, before the propeller device is put into operation.

It is seen that a root portion 311a, 311b of each turbine blade is provided with an elongated slot 322a, 322b. A couple of fixation screws 321a, 321b is provided, which enable releasable connecting the turbine blades with a corresponding pivot axle. By virtue of this provision, when the screws are released the turbine blades could be linearly displaced along the slots with respect to their pivot axles and brought in a position, where pivot axis of each turbine blade passes through its pressure center. Furthermore, the control blades are secured on their respective pivot axles with possibility for disconnecting, such that they can be turned about respective pivot axles to be inclined at a desired angle of attack. By virtue of this provision once the control blades are secured on their pivot axles their pivoting would cause pivoting of the turbine blades to an angular disposition, in which the desired angle of attack would be established. After setting the required AOA it will be maintained by the control device 400 unequivocally due to constant relative angular position of the control blades with respect to the turbine blades.

According to some embodiments, the turbine system 300 further comprises a limiting mechanism for limiting angular displacement of the turbine blades 310a and 310b to a preselected limit angle.

Figure 9:
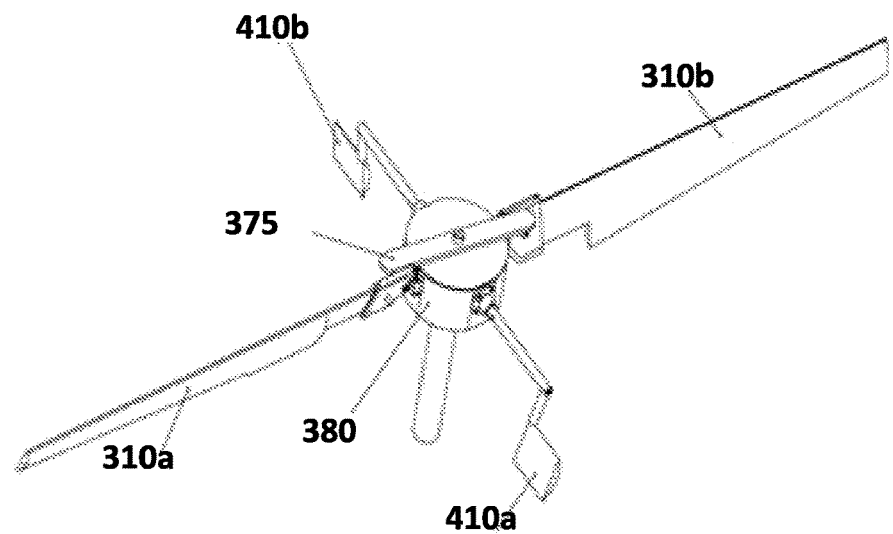
FIG. 9 shows a turbine system having a limiter for limiting the angular position of the turbine blades.

In an exemplary embodiment shown in FIG. 9 the limiting mechanism comprises a limiter 375, which is configured as a bar releasably connected to a butt face of the hub 380 of the turbine assembly such that the limiter 375 would block further pivoting of the turbine blades 310a and 310b once the pivoting exceeds a predefined limit angle. The required limit angle may be determined empirically according to a particular design of the turbine system 300 as well as depending on the type of the propeller device. So for example if this propeller device is a wind turbine, the limit angle would be set for optimizing AOA of the turbine blades 310a and 310b when they start rotating when there is no or little wind.

Other transmission mechanisms may be used for transmitting torque from the control blades to the turbine blades which may or may not include gears as known in the art.

The control device described above can be used for any purpose known in the art that requires inclination control of a propeller devices such as wind turbines and various self propulsing vehicles and the configuration of the control blades and their positioning may vary in accordance with the requirements of the particular propeller system. The number of secondary and turbine blades may also vary and may be unequal depending on implementations of the present invention and their sizes ratio may also vary from one implementation to another. The control blades, as mentioned above, may be located (i) coaxially and in front of the rotation plant of the turbine blades as shown in FIGS. 1-6B; (ii) a non-coaxially to the central axis of the turbine blades; (iii) or coaxially to the central axis and in the same rotation plane as the turbine blades as shown in FIG. 8A. In cases in which the control blades are not located in the same rotation plane as the turbine blades, they may be located in front, behind or angularly thereto, depending on system requirements and on the configuration of the transmission unit.

According to some embodiments of the invention, the control device also allows setting of predefined angular disposition of the turbine blades corresponding to required AOA and maintaining thereof when the propelling device is in operation.

Figure 10:
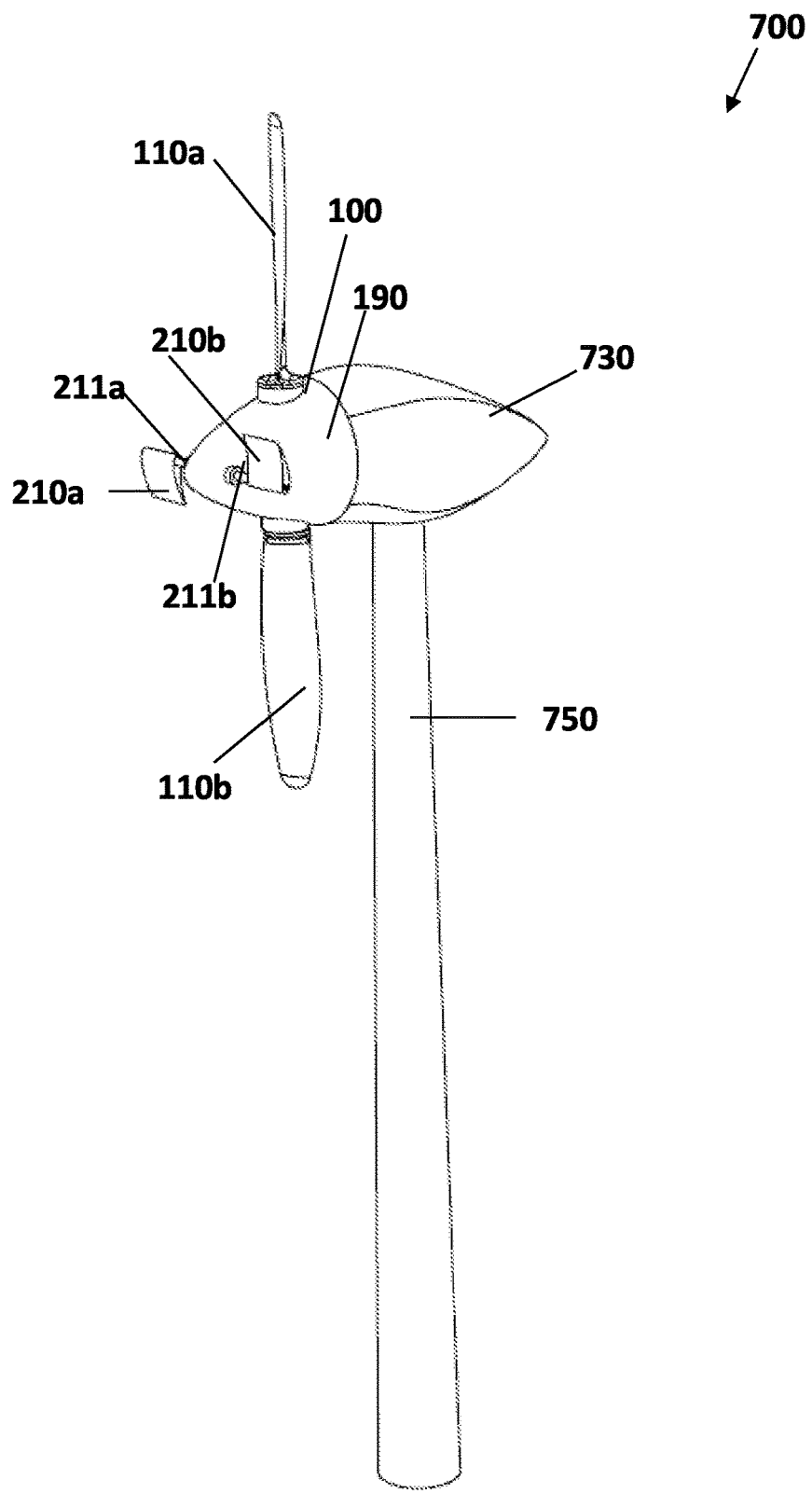
FIG. 10 shows an isometric view of a wind turbine system having a pitch control device, according to some embodiments of the invention.

Reference is now made to FIG. 10 schematically illustrating a propeller device comprising a wind power plant 700 having the turbine system 100 installed therein serving as a wind turbine system for the purpose of converting kinetic energy of wind to electric power. The turbine system 100 is secured on a tower 750 via a nacelle 730. The pitch control device of the present invention is used for adjusting the AOA of turbine blades 110a and 110b to maintain them in a required angular disposition defined by a predefined attack angle For example, to start the rotor of the turbine 100 the AOA may be optimal if it is set at a first AOA "α1" such as to 13 degrees to which the control device 200 should set the turbine blades 110a and 110b to and when the turbine blades 110a and 110b are already at motion the optimal AOA thereof should be set to a different value "α2" such as to 6 degrees. This may be done by installing a stopper for limiting the maximal AOA of the blades, e.g. such as the stopper 375 that has been described above.

Reference is now made to FIG. 11 schematically illustrating a turbine system 600 according to still further embodiment of the invention. This turbine system 600 includes a turbine assembly having turbine blades 610a and 610b, which are connected to a hub 680 rotating over a rotational axis X2 as well as pivoting over turbine blade axes Y3,Y3'. A control device 500 of the turbine system 600 is located coaxially with the rotational axis X2 and at a distance from the rotational plane of the turbine blades 110a and 110b. The control device is situated in front of the turbine blades. The control device 500 comprises two control blades 510a and 510b secured on corresponding control blade axles 511a and 511b in a pivotal manner such as to pivot with respect to pivot axes Y4,Y4' when the control blades are exposed to flow of fluid.

The control blades 510a and 510b are installed such that they are in inverted positions in the sense that the upper and lower surfaces of wing portions 51a and 51b always face opposite directions. The pivot axles are connected to the respective control blades through a shoulder portion 52a/52b.

The control device 500 of the turbine system 600 also comprises a gear based transmission unit 550 for mechanically transmitting torque caused by pivoting of the control blades 510a and 510b in response to flow of fluid applied to them, to the turbine blades 610a and 610b. By virtue of this provision it is possible to control their angular position and maintain the required predefined optimal AOA.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments and/or by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Although the invention has been described in detail, nevertheless changes and modifications, which do not depart from the teachings of the present invention, will be evident to those skilled in the art. Such changes and modifications are deemed to come within the purview of the present invention and the appended claims.

The invention claimed is:

1. A device for control of an angular position of turbine blades of a propeller device, wherein the turbine blades are rotatable about a rotational axis and are pivotally displaceable about their respective pivot axes, said device comprising:
   a) a set of two control blades connected with the turbine blades and pivotally displaceable about their respective pivot axes thereof when propeller device is exposed to a flow of fluid; and
   b) a transmission unit comprising a main gear and a secondary gear which transmits pivotal displacement of the control blades to the turbine blades such that the turbine blades could be pivoted in respect to their pivot axes by the control blades via said transmission unit, wherein pivoting of the turbine blades takes place simultaneously with pivoting of the control blades,
   wherein each of the control blades are connected to a first end of a control blade axle, wherein the control blade axle comprises a second end which is directly connected to the main gear and wherein the main gear directly engages the secondary gear;
   wherein the arrangement of said control blades being such that an angle of attack of the turbine blades is set and maintained automatically by said control blades irrespective of direction of the fluid flow,
   wherein the pressure center (PC) of each of the turbine blades is located over the pivot axis thereof, and the pressure center (PC) of the control blades is offset from their pivot axes
   wherein said turbine blades and said control blades are rotatable about the same rotational axis within the same plane.

2. The device for control of angular position of turbine blades as defined in claim 1, in which the set of control blades comprises at least two control blades, which are disposed symmetrically and oppositely with respect to the rotational axis.

3. The device for control of angular position of turbine blades as defined in claim 2, in which said control blades are defined by an upper surface and by a lower surface, and said control blades are disposed with respect to the rotational axis such that the upper surface of one control blade and the lower surface of an opposite control blade face to the same direction, while the lower surface of the one control blade and the upper surface of the opposite control blade face to an opposite direction.

4. The device for control of angular position of turbine blades as defined in claim 2, in which the control blades are situated with respect to the rotational axis such that the control blades would pivot until respective rotational moments arising due to the flow of fluid and applied to the control blades are mutually compensated.

5. The device for control of angular position of turbine blades as defined in claim 4, wherein said device controls two turbine blades, each of the turbine blades is secured to a pivot axle and is disposed with respect thereto such that pivoting axis of the turbine blade passes through a pressure center of the turbine blade, the arrangement being such that an angular disposition of the turbine blade by the control blades set via said transmission unit remains invariant irrespective of direction of the flow of fluid.

6. The device for control of angular position of turbine blades as defined in claim 1, in which the turbine blades are secured on their corresponding pivot axles with possibility for disconnection, such that position of each turbine blade with respect to its pivot axle could be adjusted.

7. The device for control of angular position of turbine blades as defined in claim 1, in which relative angular position of the turbine blade with respect to the control blades could be adjusted.

8. The device for control of angular position of turbine blades as defined in claim 7, in which said adjustment of relative angular position of the turbine blades comprises setting the turbine blades at a desired angle of attack.

9. The device for control of angular position of turbine blades as defined in claim 8, in which said angle of attack is 6 degrees.

10. The device for control of angular position of turbine blades as defined in claim 1, in which the control blades are configured and dimensioned such that they are smaller than the turbine blades.

11. The device for control of angular position of turbine blades as defined in claim 1, comprising a limiter of pivoting of the turbine blades.

12. The device for control of angular position of turbine blades as defined in claim 11 further comprising a hub adapted to carry the control blades and the turbine blades, wherein said limiter is configured as a rod releasably secured on a butt end of the hub.

13. The device for control of angular position of turbine blades as defined in claim 1, in which said propeller device is selected from a group consisting of a wind turbine, a hydraulic turbine, an airplane, a turbojet, a helicopter, a ship, a submarine, a torpedo, a motor boat, a dirigible, a turbine pump and a turbine compressor.

14. The device for control of angular position of turbine blades as defined in claim 1, wherein pivoting of the turbine blades takes place in the same direction with the control blades and at the same pi voting angle thereof.

15. The device for control of angular position of turbine blades as defined in claim 1, wherein each of the turbine blades comprises a pressure center (PC) which is located over the pivot axis thereof, and the pressure center (PC) of the control blades is offset from their pivot axes.

16. A propeller device for control of angular position of turbine blades thereof in response to fluid flow applied thereover, said propeller device comprising:
   a) a set of turbine blades, which are rotatable about a rotational axis and are pivotally displaceable about their respective pivot axis;
   b) a set of two control blades connected with the turbine blades and pivotally displaceable about a respective pivot axis when propeller device is exposed to a flow of fluid; and
   c) a transmission unit comprising a main gear and a secondary gear which transmits pivotal displacement of the control blades to the turbine blades such that the turbine blades could be pivoted in respect to their pivot axis, by the control blades via said transmission unit, while pivoting of the turbine blades takes place simultaneously with pivoting of the control blades,
   wherein each of the control blades are connected to a first end of a control blade axle, wherein the control blade axle comprises a second end which is directly connected to a main gear and wherein the main gear directly engages a secondary gear;

wherein the arrangement of said control blades being such that an angle of attack of the turbine blades is set and maintained automatically by said control blades irrespective of direction of the fluid flow, wherein the pressure center (PC) of each of the turbine blades is located over the pivot axis thereof, and the pressure center (PC) of the control blades is offset from their pivot axes wherein said turbine blades and said control blades are rotatable about the same rotational axis within the same plane.

* * * * *